Feb. 26, 1924.
M. L. SCOTT
TIRE
Filed April 18, 1922   2 Sheets-Sheet 1
1,485,299
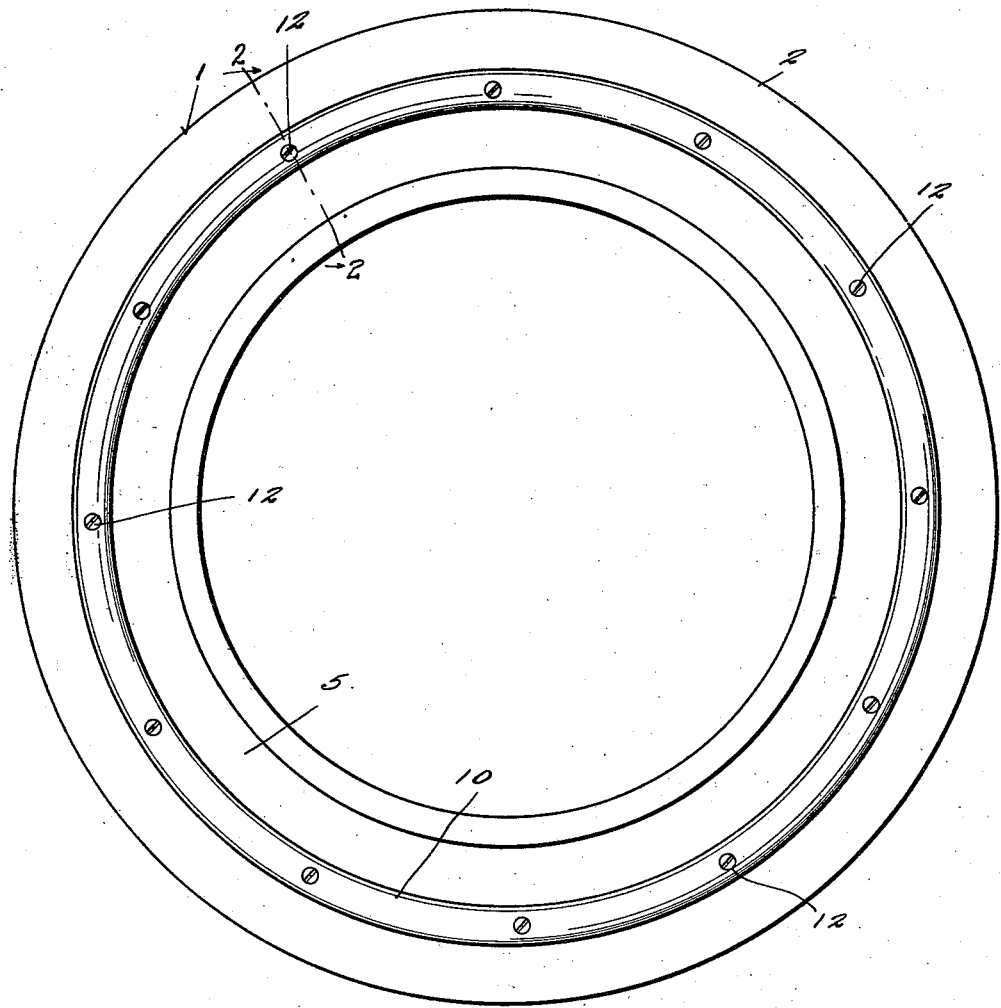
Fig. 1.
Fig. 5.
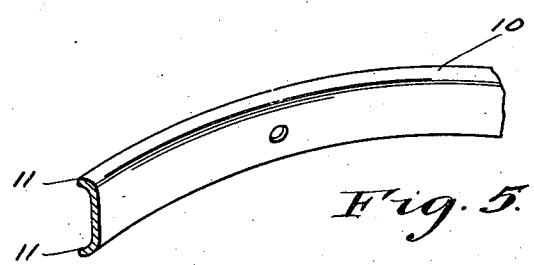
M. L. Scott, INVENTOR
BY Victor J. Evans ATTORNEY
WITNESS:

Feb. 26, 1924.  1,485,299
M. L. SCOTT
TIRE
Filed April 18, 1922   2 Sheets-Sheet 2
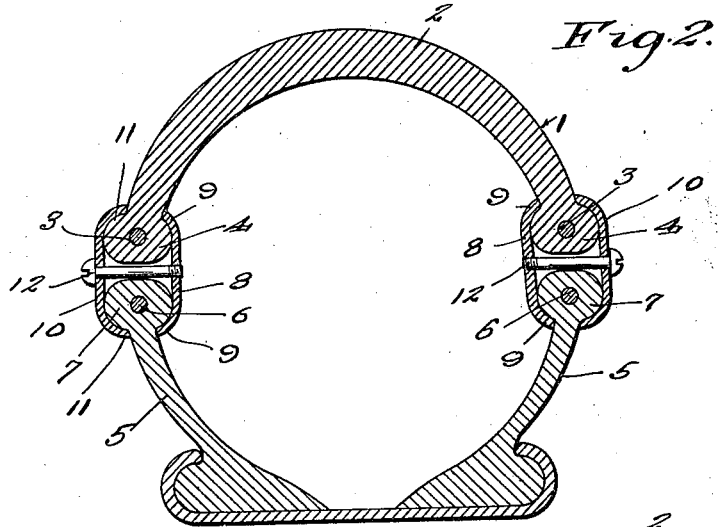
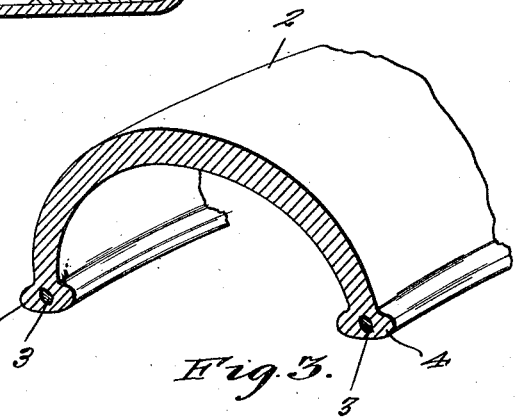
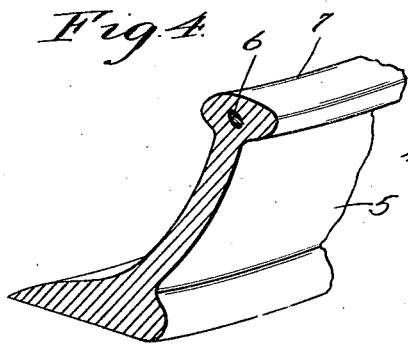
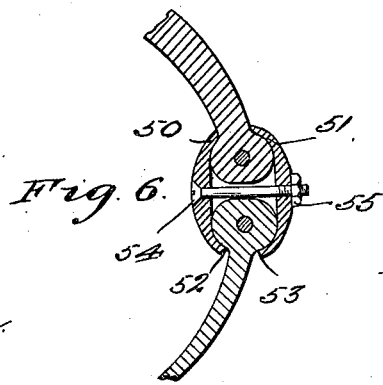
M. L. Scott INVENTOR
BY Victor J. Evans ATTORNEY
WITNESS:

Patented Feb. 26, 1924.

1,485,299

UNITED STATES PATENT OFFICE.

MARTIN L. SCOTT, OF PECAN GAP, TEXAS.

TIRE.

Application filed April 18, 1922. Serial No. 554,418.

*To all whom it may concern:*

Be it known that I, MARTIN L. SCOTT, a citizen of the United States, residing at Pecan Gap, in the county of Delta and State of Texas, have invented new and useful Improvements in Tires, of which the following is a specification.

My present invention has reference to a pneumatic tire casing.

My object is to simplify and improve the existing art by producing a tire casing in which the tread portion thereof is formed separately from the sides, but in which the sides are connected to the tread in a novel manner to produce a casing for pneumatic tires in which a tread portion has its edges reinforced and beaded, and in which separable side walls have their edges which confront the edges of the tread likewise reinforced and beaded, the beads upon both the inner and outer faces of the tire being engaged by the rounded or flanged edges of metallic rings, while adjustable elements connect the opposed pairs of rings at determined intervals, forcing the same to compress the beads of the tread and side walls and so connect the tread and side walls in an efficient but simple manner.

The foregoing, and other objects which will appear as the nature of the invention is better understood, may be accomplished by a construction, combination and operative association of parts, such as is disclosed by the drawings which accompany and which form part of this specification.

In the drawings:—

Figure 1 is a side elevation of a tire casing in accordance with this invention.

Figure 2 is a greatly enlarged sectional view approximately on the line 2—2 of Figure 1.

Figure 3 is a fragmentary perspective view of the tread portion of the tire.

Figure 4 is a similar view of one of the side walls of the tire.

Figure 5 is a similar view of one of the ring members employed.

Figure 6 is an enlarged transverse sectional view through the beaded meeting edges of the tread and a side wall section illustrating modified forms of rings for connecting the sections.

Referring now to the drawings in detail, a complete tire in accordance with this invention is broadly indicated by the numeral 1. The tire comprises a tread portion 2 in whose edges there is embedded a continuous metal reinforcement, such as a metallic band 3. The edges of the tread 2 are enlarged to surround the reinforcing bands, the enlargements being in the nature of cross sectionally rounded beads 4.

The side walls of the tire casing are each indicated by the numeral 5, the same having their inner edges beaded in the usual manner to be engaged by the clincher rim of the wheel. Embedded in each of the outer edges of the side walls 5, there is a continuous metal member in the nature of a band 6, the said edges being enlarged at the reinforced portions thereof, the said enlargements providing cross sectionally rounded beads 7.

Arranged in the tire 1, against the sides thereof are annular members in the nature of flat rings 8 respectively. These rings have their edges rounded inwardly to provide lips 9, the lips contacting with the beads 4 and 7 on the inner surfaces of the tread 2 and the side walls 5. On the outer faces or sides of the casing 1 there are similar metal annular members 10. These members or rings 10 have their edges rounded inwardly to provide flanges 11, the said flanges being in contacting engagement with the outer walls of the beads on the tread 2 and the side walls 5. Passing through the opposed inner and outer rings at the sides of the tire there are bolt members 12, the said bolts preferably having their heads disposed in contacting engagement with the outer ring members 10 and their threaded shanks entering threaded openings in the inner ring members 8.

It is thought that the foregoing description, when taken in connection with the drawings will fully set forth the construction and advantages of the improvement to those skilled in the art to which such inventions relate without further detailed description.

It is also to be understood that I am entitled to all such changes and modifications as fall within the scope of what I have claimed, as for instance, in Figure 6 of the drawings I have illustrated the beaded confronting edges of the tire sections having their inner and outer faces contacted by members 50 and 51 respectively. Each of these members is substantially concavo-convex in cross section and gradually decreases in thickness from the center to the edges thereof. The edges 52 and 53 of the members 50 and 51 respectively are inwardly directed and provide what may be termed lips and which lips contact with the under surfaces of the beads 7. The member 50 is provided with a reamed opening, the member 51 being provided with an aligning round opening. In the reamed opening there is received the headed end of a bolt 54, which also passes through the opening in the member 51. Of course, other modifications falling within the scope of the claims may be resorted to.

Having described the invention, I claim:—

1. A casing for pneumatic tires comprising a tread section and side wall sections, the confronting edges of the tread and side walls formed with cross sectionally rounded beads, annular metal members having flanged edges disposed in the casing to contact with the beads of the tread and side walls, annular metal members arranged against the tire to contact with the outer surfaces of the beads of the tread and side walls, and adjustable means passing between the beads and connecting the pairs of metal members for forcing the same together to compress the beads of the tire casing therebetween.

2. A tire casing comprising a tread section and side wall sections, said sections having their confronting edges reinforced and enlarged around the reinforcement to provide cross sectionally rounded beads, inner and outer annular metal members in contact with the inner and outer faces of the beads, said members having their edges rounded inwardly to provide flanges, and adjustable means passing between the confronting faces of the beads on the tire sections connecting the confronting pairs of metal members and compressing the beads of the tire sections therebetween.

3. A tire casing comprising a tread section and side sections, all of said sections having their confronting edges formed with cross sectionally rounded reinforced beads, means engaging the inner and outer faces of the beads, and adjustable means passing between the beads and through said mentioned means for securing the same on the beads and for connecting the tire sections.

In testimony whereof I affix my signature.

MARTIN L. SCOTT.